United States Patent [19]

Brown et al.

[11] Patent Number: 5,164,983
[45] Date of Patent: Nov. 17, 1992

[54] TELEMARKETING COMPLEX PERFORMANCE MANAGEMENT SYSTEM

[75] Inventors: Percy B. Brown, East Brunswick; Brenda Casselman, Matawan, both of N.J.; Gerard Conn, Brooklyn, N.Y.; Robert A. Malmi, Red Bank, N.J.; Valentine C. Matula, Granville, Ohio; Margaret H. Redberg, Red Bank, N.J.; Dimitri T. Stein, Cliffwood, N.J.; Bernadette M. Strout, Hamilton Township, Mercer County, N.J.

[73] Assignee: American Telephone & Telegraph Company, New York, N.Y.

[21] Appl. No.: 646,922

[22] Filed: Jan. 28, 1991

[51] Int. Cl.$^5$ ............... H04M 3/36; H04M 3/50; H04M 7/00
[52] U.S. Cl. ............... 379/265; 379/112; 379/207
[58] Field of Search ............... 379/265, 266, 309, 207, 379/221, 112

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/113 |
| 4,737,983 | 4/1988 | Frauenthal et al. | 379/221 |
| 4,788,718 | 11/1988 | McNabb et al. | 379/113 |
| 5,036,535 | 7/1991 | Gechter et al. | 379/210 |
| 5,062,103 | 10/1991 | Davidson et al. | 370/58.1 |

Primary Examiner—Thomas W. Brown

[57] ABSTRACT

A telemarketing complex is managed by a system that compiles and processes traffic analysis data obtained from customer premises-based information sources as well as public switched telecommunications network-based information sources, such that service levels are automatically and dynamically balanced among telecommunications centers (TCs) in the complex. Typically, the telemarketing complex is comprised of a plurality of ACDs and a plurality of data centers that may be selectively linked to the (TCs) where the telemarketer receives calls. The system includes: (1) an interface to network-based services that report the origin and destination of each of a plurality of calls received by the telemarketer at all locations; (2) an interface to network-based services that enables the telemarketer to affect changes in call processing logic; and (3) a traffic control center processor (TCCP) that accepts input data from all other elements in the system. The system accumulates performance data at the TCCP from each ACD and telemarketer database located at a data center (DC), while contemporaneously monitoring both the origins and destinations of the plurality of calls received at each ACD as well as the initiation of changes in call processing logic. The system analyzes the data to generate signals for implementing call routing changes needed to balance service levels among ACDs or changes in the staffing force levels at selected TCs where calls are received. The process is accomplished in real time, and is repeated at a desired frequency.

22 Claims, 7 Drawing Sheets

FIG. 3
INPUT DATA

| ACD PERFORMANCE MEASURES | |
|---|---|
| ASA | AVERAGE SPEED OF ANSWER |
| SVL | PERCENT SERVICE LEVEL |
| NCH | NUMBER OF CALLS HANDLED |
| NOC | NUMBER OF OUTBOUND CALLS |
| NCA | NUMBER OF CALLS OFFERED |
| AAV | AVERAGE AGENTS AVAILABLE |
| PPM | PRIMARY POSITIONS MANNED |
| TNCO | TRUNK NUMBER OF CALLS OFFERED |
| TNCH | TRUNK NUMBER OF CALLS HANDLED |
| TUT | PERCENT TRUNK UTILIZATION TIME |
| NA | NETWORK ATTEMPTS (800 CALLS) |
| CB | CALLS BLOCKED |
| AHT | AVERAGE HANDLING TIME |
| ATT | AVERAGE TALK TIME |
| AWT | AVERAGE WORK TIME |
| AOT | AVERAGE OUTBOUND TIME |
| AAW | AVERAGE DELAY IN QUEUE |
| LFX | PERCENT LOCAL + FX CALLS |

301

DATA CENTER DATA BASE VARIABLES
AVERAGE $VALUE PER ORDER
CAPACITY/INVENTORY AVAILABLE
$VALUE PER ORDER BY GEOGRAPHICAL REGION
NUMBER OF ORDERS PER INTERVAL
NUMBER OF ORDERS PER DAY
TOTAL ASSOCIATES
STATUS CHANGED
CUSTOMER PROFILE: AGE,SEX,WEIGHT,etc.,

302

800 DCS DATA
GEOGRAPHIC ORIGIN OF CALLS BY NPA
DESTINATION OF CALLS BY SIS CODE

303

USS DATA
DATE AND TIME OF LAST CALL PROCESSING LOGIC (CPL) CHANGE
ID OF CPL PROGRAM INVOKED
ID OF CPL PROGRAM PRIOR TO CHANGE

304

TELEMARKETER CONFIGURATION DATA
ACD-DATA CENTER MAPPING
TRUNK GROUP-SPLIT/GATE MAPPINGS
SERVICE OBJECTIVES
ALTERNATE CALL ROUTING SPECIFICATIONS
DATA COLLECTION SERVICE-SPLIT MAPPINGS
APPLICATION/CAMPAIGN SPLIT/GATE MAPPINGS
ALARM THRESHOLD DEFINITIONS
ALARM FILTER DEFINITIONS

305

TELEMARKETER FORECAST DATA
ESTIMATED NUMBER OF TC ATTENDANT POSITIONS TO BE STAFFED

306

FIG. 7
OUTPUT DATA

701 — REACTIVE PROCESS
- ESTIMATED REMAINING CALL LOAD
- ESTIMATED CURRENT CALL LOAD
- PREDICTED CALL LOAD FOR REMAINDER OF SERVICE INTERVAL
- PROBABILITY OF SUCCESS
- PROBABILITY THRESHOLD IMPLYING TRAFFIC CAN BE ACCEPTED
- PROBABILITY THRESHOLD IMPLYING TRAFFIC SHOULD BE SHIFTED
- CALLS TO SHIFT WITH AND WITHOUT DELAY
- CALLS TO ACCEPT WITH AND WITHOUT DELAY
- AGENTS WITH AND WITHOUT DELAY
- CALL LOAD RATE TO SHIFT WITH AND WITHOUT DELAY
- CALL LOAD RATE TO ACCEPT WITH AND WITHOUT DELAY
- PERCENT OF TRAFFIC TO SHIFT WITH AND WITHOUT DELAY
- PERCENT OF TRAFFIC TO ACCEPT WITH AND WITHOUT DELAY

702 — PROACTIVE PROCESS
- ASA SERVICE OBJECTIVE
- % CALLS BLOCKED SERVICE OBJECTIVE
- TSC IDENTIFICATION
- FORECAST INTERVAL OF LAST DATA TO DETERMINE CURRENT FORECAST
- FORECAST INTERVAL OF THE CURRENT FORECAST
- FORECAST NUMBER OF AGENTS
- FORECAST OF CALL LOAD
- NUMBER CALL ATTEMPTS
- CURRENT FORECAST OF CALL ATTEMPTS
- CURRENT FORECAST OF ASA
- CURRENT FORECAST OF PERCENT CALLS BLOCKED
- FORECAST CALLS TO SHIFT WITH AND WITHOUT DELAY
- FORECAST CALLS TO ACCEPT WITH AND WITHOUT DELAY
- FORECAST AGENTS WITH AND WITHOUT DELAY
- FORECAST CALL LOAD RATE TO SHIFT WITH AND WITHOUT DELAY
- FORECAST CALL LOAD RATE TO ACCEPT WITH AND WITHOUT DELAY
- FORCAST PERCENT OF TRAFFIC TO SHIFT WITH AND WITHOUT DELAY
- FORCAST PERCENT OF TRAFFIC TO ACCEPT WITH AND WITHOUT DELAY

703 — ALTER PROCESS
- RECOMMEND PERCENT OF TRAFFIC TO BE SHIFTED
- INDENTIFICATION OF ACD(s) CURRENTLY RECEIVING EXESS TRAFFIC
- INDENTIFICATION OF ACD(s) TARGETED TO RECEIVE REDIRECTED TRAFFIC
- ORIGINATING NPA(s) OF TRAFFIC TO BE SHIFTED
- RECOMMENDED NUMBER OF ATTENDANTS TO BE INCREASED/DECREASED
- INDENTIFICATION OF SPLITS/GATES TO WHICH OR FROM WHICH ATTENTANTS ARE TO BE ADDED OR SUBTRACTED
- TIME DEADLINE BY WHICH CHANGES SHOULD BE MADE

TELEMARKETING COMPLEX PERFORMANCE MANAGEMENT SYSTEM

TECHNICAL FIELD

This invention relates generally to the field of telemarketing, and particularly to a system and a method for managing the performance of a telemarketing complex that consists of a plurality of telemarketing agent terminals, a plurality of ACDs for selectively routing calls placed to the complex to particular terminals, and, in most typical situations, at least one database containing information used in the complex in telemarketing campaigns.

BACKGROUND OF THE INVENTION

Many large organizations including businesses and government agencies offer toll-free (e.g., 800 number) telephone calling services for the convenience of their customers or constituents. Telemarketers, airlines, hotels, and travel agencies are examples of business organizations that offer such services. Telemarketers, as the term is used here, refers to inbound telemarketing organizations such as catalogue sales companies or telemarketing bureaus that receive calls via more than one telephone number for more than one sales campaign or client organization. Telemarketers shall serve as the prime example of organizations that might benefit from the present invention.

A telemarketer may establish a telemarketing complex or system that includes telecommunications centers (TCs) established at multiple geographically diverse locations in order to receive calls. Each TC is typically linked to one or more data centers (DCs) in the complex. However, there may be some situations in which data centers are not included in a telemarketing complex. Each TC is equipped with an automatic call distributor (ACD) to receive calls and subsequently distribute those calls among groups of agents or attendants assigned to each location. The attendants generally obtain information needed to respond to a customer or constituent from one of a plurality of DCs that contain what can be described as "customer order fulfillment" information, which for example, may include detailed profiles for specific clients whose calls are being processed, inventory of stock remaining in warehouses, or number of unfilled seats on airplanes. If the telemarketing complex does not include any DCs, the attendants will respond based upon information obtained from the customer or constituent, or from other sources such as books and catalogs. The DCs may be distributed among multiple geographically diverse locations and may be linked to one another. Each DC may contain multiple databases. a traffic control center (TCC) is arranged to monitor and control the volume of call traffic processed by each TC in the complex and to monitor the status of DCs.

Historically, an organization that provides toll-free calling to its customers or clients may have made available a single telephone number through which calling parties could gain access to at least one of a plurality of TCs. In this relatively simple situation, the prevention of call blocking at any ACD and balanced processing of calls at all ACDs have been primary concerns of the organization providing toll-free calling.

A telemarketer operates in a relatively more complex environment, where calls are concurrently received via more than one toll-free telephone number for a variety of telemarketing applications or "campaigns". For example, a telemarketer may manage three campaigns where calls are placed to a first toll-free number, by one group of customers ordering automobile tires from a tire company, calls are placed to a second toll-free number by a second group of customers ordering pet food from a pet food supplier, and calls are placed to a third toll-free number from yet a third group of customers seeking to reserve rooms with a national hotel chain. In some instances, one campaign may require more than one toll-free telephone number. For example, the pet food company could have one telephone number for ordering dog and cat food, a second telephone number to order bird seed, and a third telephone number to order fish food. Also, calls for each campaign may not be received at all locations. In the example given above, the telemarketer may have five locations for receiving calls, with an ACD at each location. However, while hotel reservations may be received at all five locations, orders for pet food may be received at only three locations, and orders for tires may be received at only one location. Note that a telemarketer may receive local exchange and foreign exchange calls in addition to toll-free calling provided by interexchange carriers.

If the telemarketer is conducting more than one campaign, as in the example above, or if, for a single telephone number, calls are partitioned among trunk groups according to the geographical origins of calls or other predetermined criteria, then attendants at each location may be divided into groups and assigned to answer calls (arriving on designated trunk groups) that satisfy the predetermined criteria. Such trunk group/attendant group mappings are referred to as "gates" or "splits". Each attendant who answers calls is assigned to a primary split and may be cross-trained between campaigns for assignment to secondary and tertiary splits.

The ability of a telemarketer to monitor and control telephone network traffic is a major concern that focuses on three areas—namely, the timeliness of information, integration of information from diverse sources, and autonomous decision making. Historically, TCC staff personnel have not been able to capture, process or use real-time data (i.e., data that arrives at the TCC in time to appropriately affect the decision-making process) when making decisions about shifting traffic among ACDs. Instead, TCC staff personnel have had to rely on historic reports that reflected traffic profiles for an earlier period. Thus, TCC staff personnel were expected to assume that the historical reports were indicative of present traffic conditions in the network. Consequently, decisions were made to modify the call processing logic, that reroutes traffic flow in the Public Switched Telecommunications Network (PSTN), based on the dated historical information, moderated by the judgement of TCC staff personnel, The difficulty of integrating information from diverse sources may be appreciated by considering that a typical traffic control center (TCC) at which changes to the call processing logic (i.e., stored software instructions that specify conditional routing and termination treatments for telephone calls) are formulated, periodically receives and must process status information from all TCs and their resident ACDs as well as customer order fulfillment information that may be contained in any DCs used by the organization. The assembled information must be analyzed by traffic control center personnel in light of both call handling capacity thresholds at the monitored ACDs as well as the status of alternate ACDs to which new excess calls may be directed.

The lack of autonomy in decision making by the TCC staff is of concern because of delays in the implementation of decisions that result. Traffic control center staff personnel must identify an ACD that is overly congested and a candidate ACD that is lightly loaded and thus available to receive additional calls.

The preceding discussion suggests that sophisticated contemporary telemarketers are concerned not only about call blocking at ACDs, as was addressed by several prior art systems described below, but also about other issues not addressed in the prior art, viz.: (1) maintenance of balanced distribution of call traffic across individual telemarketing campaigns; (2) the ability to monitor telemarketer complex performance and implement change in real-time; (3) rapid integration of information from diverse sources such as ACD performance information, TC staffing information, and PSTN call traffic volume and origins; and (4) formulation and implementation of centralized decisions at the TCC. In sum, today's telemarketer is ultimately concerned with maintaining a desired level of service for each campaign where characteristics of individual campaigns may differ greatly. Note that service level is a function of the number of agents available to handle calls, the rate at which calls are received, the time required to serve a calling party, and other factors.

Rather than focusing on maintaining balanced levels of service among ACDs, the prior art has focused primarily on methods that prevent the blocking of calls from the PSTN at any of a plurality of ACDs or methods that result in balanced distribution of calls among a plurality of ACDs where access to the network of ACDs is gained through one toll-free telephone number. U.S. Pat. No. 4,191,860 issued to R. W. Weber on Mar. 4, 1980, allows calls to be allocated to individual ACDs on a fixed percentage basis as specified by the telemarketer. This method does not have the capability to dynamically adapt to variable conditions encountered when load balancing is attempted. Other arrangements have been devised where load balancing is attempted by semiautomatic means.

U.S. Pat. No. 4,611,094 issued to R. L. Asmuth et al. on Sep. 9, 1986, describes a method that allows a telemarketer to customize 800 service call processing logic based on additional call processing instructions obtained from a call originator. While this method may be used to redirect calls among ACDs in response to information provided by call originators, its usefulness as a means of load balancing is dependent upon the ability of the telemarketer to change parameters and re-initiate the customer record program that directs specific announcements to callers. This method is ill prepared to meet a telemarketer's need to modify call processing logic in order to accomplish real-time load balancing.

U.S. Pat. No. 4,737,983 issued to J. C. Frauenthal et al. on Apr. 12, 1988, describes a method for balancing 800 telephone service call loads based on the state of traffic congestion at each of the multiple locations receiving calls. A switching office receiving a call destined for one of the telemarketer's ACDs may query a central database to determine the current state of traffic congestion for a plurality of the telemarketer's ACDs and—based on that information—direct the call to an alternate ACD when warranted. This method does not consider the traffic conditions within the PSTN, nor the fact that call handling capabilities may vary among locations receiving calls.

Additional automation may be introduced into the processes described above by programming each of the ACDs to determine if its existing capacity threshold is exceeded. If the capacity threshold is exceeded, the affected ACD queries a first "overflow" ACD via an interflow trunk to determine if it can accept the call without exceeding its threshold. If the threshold is not exceeded, the "overflow" ACD will accept the call. If the ACD threshold will be exceeded, the next overflow ACD is queried via another interflow transfer, and the process of call acceptance or additional ACD queries is repeated until the call is ultimately accepted by an ACD, is blocked, or the calling party disconnects. This solution is undesirable because of the expense of required interflow trunks and the general inability of the method to address call congestion at any ACD on a campaign-by-campaign basis.

U.S. Pat. No. 4,788,718 issued to S. D. McNabb and R. S. Yien on Nov. 29, 1988, describes a method and network arrangement for compiling PSTN traffic analysis data for an 800 telephone service, based on call data collected through a common channel signaling (CCS) network. The objective of the McNabb method is to contemporaneously reduce total call blocking to multiple TCs having specialized call handling capabilities that may differ among locations receiving calls. This approach to load balancing relies exclusively on the telemarketer's knowledge of 800 service call volume for a single 800 number and does not consider ACD performance data or any other information that may be obtained from the telemarketer's premises.

The prior art makes no provision for the continuous use of combined data obtained from both PSTN and telemarketer complex sources to balance service levels and reduce call blocking or to enhance call load balancing among a plurality of ACDs. The prior art, by focusing on call blocking at one of a plurality of ACDs, has failed to address the telemarketer's information needs that facilitate business decisions. These needs include the ability to ensure that desired levels of service will be maintained for a plurality of telemarketing campaigns that are supported by a plurality of splits at a plurality of TCs.

SUMMARY OF THE INVENTION

The problems presented above are resolved, and an advance in the art is obtained in a system and a method of compiling and processing traffic analysis data obtained from both telemarketer premises-based information sources and public switched telecommunications network-based information sources, such that service levels are automatically and dynamically balanced among TCs in a telemarketing complex. In accordance with our invention, a telemarketing complex is comprised of a plurality of telecommunications centers (TCs) equipped with ACDs (that may or may not be linked via interflow trunks) and in most situations, a plurality of telemarketer data centers that may be selectively linked to the TCs where a telemarketer receives calls. The telemarketer complex is monitored and controlled by a telemarketing complex management system in the TCC, the system including: (1) an interface to network-based services that report the origin and destination of each of a plurality of calls received by the telemarketer at all locations; (2) an interface to network-based services that enables the telemarketer to affect changes in call processing logic; and (3) a traffic control center processor (TCCP) that accepts input data from all other elements in the system. The system operates by accumulating performance data at the TCCP from each ACD and customer order fulfillment data from each telemarketer database located at a data center (DC), while contemporaneously monitoring both the origins and destinations of the plurality of calls received at each ACD as well as the initiation of changes in call processing logic, and analyzing the data to generate signals for implementing call routing changes needed to balance service levels among ACDs or changes in the staffing force levels at selected TCs where calls are received, which is accomplished by changing the number of agents receiving calls from the ACDs. The process just described is accomplished in real time, and is repeated at a desired frequency.

In one embodiment of the invention, each ACD is sequentially polled by the TCCP to obtain data needed to prepare multiple performance measures that are observed or calculated by each ACD. Such performance measures may include the service level, the average speed with which attendants answer calls, the average time calls spend in an ACD queue before being answered by an attendant, the average holding time of calls, the proportion of traffic comprising local and foreign exchange calls, etc. If the telemarketer complex includes DCs, each of the telemarketer's databases located at such DCs is also sequentially polled to obtain business applications and economic information that may affect decisions about priorities for shifting call loads or adjusting staffing force levels. For example, information about the average value of orders placed by calling parties in the context of telemarketing operations, or the rate at which seats on aircraft are reserved in an airlines reservation context, may be acquired from a telemarketer's databases.

Concurrently with processing of local customer information, the TCCP repetitively receives data, transmitted through a CCS network interface, that summarizes the origins and destinations of calls received at all ACDs for each toll-free telephone number used by a customer. Data obtained from the CCS network and from each ACD are associated according to telemarketing campaigns/applications. The TCCP also receives data, transmitted through a PSTN interface, that informs the TCCP when changes in a customer's call processing logic have been initiated in the telephone network. Changes in call processing logic may be a consequence of specific instructions from the customer to shift call loads for the express purpose of balancing loads among ACDs or because of other state changes that may include, for example, time of day or variations in staffing levels.

After data has been acquired by the TCCP, it is processed by reducing it to a standard format, and—for fixed time intervals—aggregating the data first by "split" then by customer application (or customer telemarketing campaign). For each performance measure obtained from ACDs, a comparison is made to one or more customer specified standard performance thresholds. If requested by the telemarketer, selected data can be reported to the traffic control center attendant.

The present invention may be used in either a reactive or proactive mode. In the reactive mode, the TCCP continually compares—in real-time—values for selected ACD performance measures with one or more standard threshold values associated with each performance measure. If, through application of statistical analysis, the TCCP determines that observed data are consistently exceeding threshold for one or more performance values for a given telemarketing campaign, the TCCP generates control signals for shifting traffic among ACDs or adjusting force staffing levels at locations where calls are received. Deviations in ACD performance measures trigger the TCCP decision process. TCCP staff personel attempt to reestablish desired performance levels by modifying traffic patterns based on the network transport costs of calls or other constraints imposed by the telemarketer. If the capacity of ACDs to receive calls from the network has been exhausted, then the TCCP may recommend a reduction in the level of service provided to calling parties.

If the traffic control center attendant selects the TCCP's recommendation to shift call traffic between or among ACDs, this information is communicated to the call processing logic which controls traffic flow, by transmitting such information, either manually or automatically, to the appropriate network interface. If the traffic control center attendant selects the TCCP's recommendation for staffing changes, the appropriate number of call answering attendants must be added to or subtracted from the local work force at appropriate TCs.

In the proactive mode, the TCCP monitors the call load for each telemarketer application received by the ACDs and analyzes the data to project future traffic loads. TCCP continually compares forecasted traffic loads, based on historical data, with traffic load projections based on the statistical extrapolation of observed current real-time data. If the TCCP determines that planned staffing levels will be insufficient to receive calls at the desired level of service, changes in call processing logic that will cause shifts in traffic among ACDs or changes in staffing levels at locations where calls are received may be recommended.

BRIEF DESCRIPTION OF THE DRAWINGS

The present invention will be more fully appreciated by consideration of the following detailed description, when read in light of the accompanying drawings in which:

FIG. 3 illustrates typical elements of input data received by the various components contained in the system of FIG. 1;

FIG. 7 illustrates typical elements of output data generated by the system of FIG. 1 and applied to external system interface module (ESI) 111.

DETAILED DESCRIPTION

Figure 1:
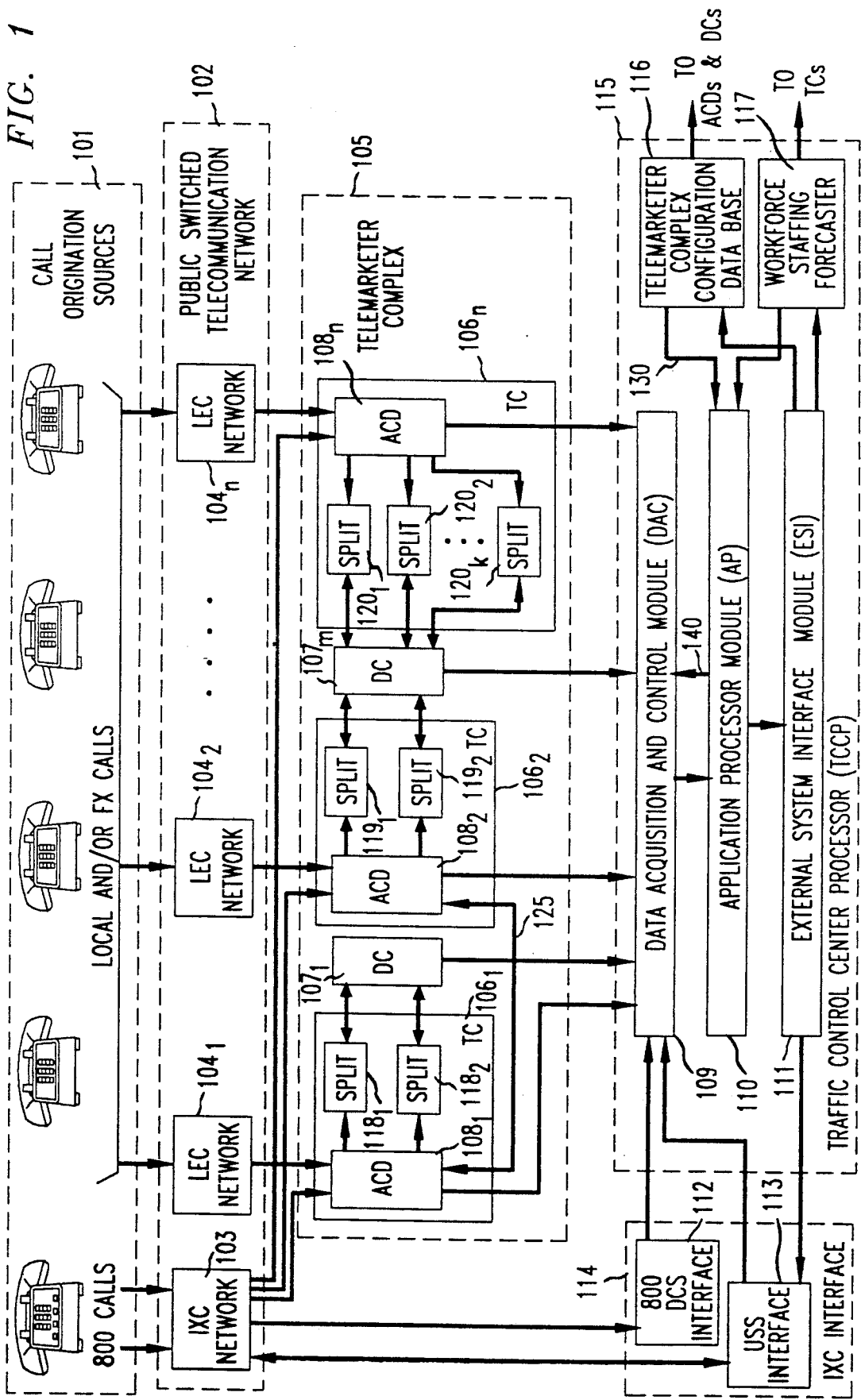
FIG. 1 is an overall block diagram of a system arranged in accordance with the principles of the present invention for managing the performance of a telemarketing complex.

The organization and arrangement of the present invention will be more readily understood by first considering FIG. 1, which illustrates the relationship between a traffic control center processor (TCCP) 115 arranged in accordance with the present invention, a public switched telecommunications network (PSTN) 102, and a telemarketer complex 105.

Telemarketer complex 105 consists of a plurality of telecommunications centers (TCs) $106_1$ through $106_n$ which may be located in different geographical areas. Typically, each TC includes at least one automatic call distributor (ACD) and one or more "splits/gates" which receive information from the associated ACD at the TC. As used herein, a "split" or "gate" refers to a group of attendant stations (sometimes called "agent terminals") which each comprise an input/output terminal and/or other display means which allow an attendant at the TC to process selected calls received by the ACD. For example, as shown in FIG. 1, TC $106_1$ includes ACD $108_1$ which provides inputs to a pair of splits $118_1$ and $118_2$. TC $106_n$, on the other hand, includes ACD $108_n$ and a plurality of splits designated $120_1$ to $120_k$. TC $106_2$ also includes and ACD $108_2$, which distributes calls to two splits $119_1$ and $119_2$.

Each of the TCs shown in FIG. 1 is associated with a data center (DC) which typically includes a database containing customer profiles for the telemarketer's customers and other information (such as inventory and capacity data) needed to service incoming calls. For the purposes of this application, this information is generically referred to as "customer order fulfillment data". Specifically, TC $106_1$ is associated with its own data center, DC $107_1$, while TCs $106_2$ and $106_n$ are both connected to the same DC $107_m$. Although not shown in FIG. 1, in some arrangements a given TC may be interconnected with more than one DC, and more than two TCs may be supported by the same DC. The DC associated with each TC can receive information from, and transmit information to, agents in each of the splits in the TC. In other situations, no DCs are contained in telemarketer complex 105, and customer order fulfillment data is obtained directly from the callers and/or from other sources such as books or catalogs.

In FIG. 1, ACDs $108_1$ and $108_2$ are shown interconnected by an interflow trunk 125, which permits calls to be passed directly from a receiving ACD to an alternate ACD under certain conditions, such as when a malfunction or an overload condition is detected at the receiving ACD. The process by which an overloaded ACD queries an alternate ACD in order to effect transfer of incoming calls is well known to persons skilled in the art of ACD design and operation.

Calls destined for telemarketer complex 105 can originate from any of a plurality of call origination sources 101. Some of the calls are applied to telemarketer complex 105 via any one of a plurality of local exchange carrier (LEC) networks $104_1$ through $104_n$ contained within the public switched telecommunications network 102. Other calls, particularly toll-free calls (e.g. "800" calls) are originated in call origination sources 101 and applied to telemarketer complex 105 via interexchange carrier (IXC) network 103, which is also part of the public switched telecommunications network 102. Thus, as shown in FIG. 1 each of ACDs $108_1$ through $108_n$ can receive and process calls from an associated one of LEC networks $104_1$ through $104_n$, as well as from IXC network 103. ACD $108_1$ receives calls from network $104_1$, ACD $108_2$ receives calls from network $104_2$ etc. Although not shown in FIG. 1, it is well known that the connection between each network 104 and an associated ACD typically involves several trunk groups.

In order to manage and control telemarketer complex 105 and permit efficient handling of traffic originated from call origination sources 101, traffic control center processor (TCCP) 115 is arranged in accordance with our invention to receive status information from each of the ACDs ($108_1$ through $108_n$) and DCs ($107_1$ through $107_m$) within customer complex 105, in a data acquisition and control module (DAC) 109. This status information describes the service level and other performance measures associated with ACD 108 as well as the status of the telemarketing campaigns served by DCs 107. In addition, in accordance with the present invention, DAC 109 is arranged to receive two separate inputs indicative of traffic conditions and call processing logic status within interexchange carrier network 103. First, traffic volume information is received via an 800 Data Collection Service (DCS) system interface 112. An example of an 800 Data Collection Service is described in the above-cited McNabb patent. Second, an input is received from a user support system (USS) interface 113, which provides information relative to the status of "call processing logic" in effect in network 103. The operation and implementation of the call processing logic can be more fully appreciated by reading the aforementioned Weber and Asmuth patents.

In order to correctly process information received from telemarketer complex 105 and IXC network 103 via IXC interface 114, DAC 109 is also provided with information describing parameters and other configuration information that applies to telemarketer complex 105. These parameters are more specifically identified in connection with FIG. 2 below. For this purpose, a telemarketer complex configuration database 116 is arranged to store the appropriate information and provide such information to DAC 109 through an application processor module 110 (described below). The output of telemarketer complex configuration database 116 is provided to AP 110 via an input on line 130, and the information is then passed from AP 110 to DAC 109 via line 140. As will be described in more detail below, database 116 also receives control inputs which identify changes needed in the relationships between ACDs $108_1$ through $108_n$ and DCs $107_1$ through $107_m$.

Still referring to FIG. 1, data collected in DAC 109 is applied to an application processor (AP) module 110 which processes the information in accordance with the present invention, in a manner described more fully below. Generally speaking, AP 110 generates a series of control signals which are applied to the external system interface module (ESI) 111 which may include a series of video display monitors as well as software for generating a series of control signals. These control signals are, in turn, applied to USS interface 113 and to a work force staffing forecaster 117. In response to the control signals, USS interface 113 can effect changes in the call processing logic within IXC network 103, while forecaster 117 can effect changes in staffing at various splits 118, 119 or 120 within TCs $106_1$ to $106_n$.

Figure 2:
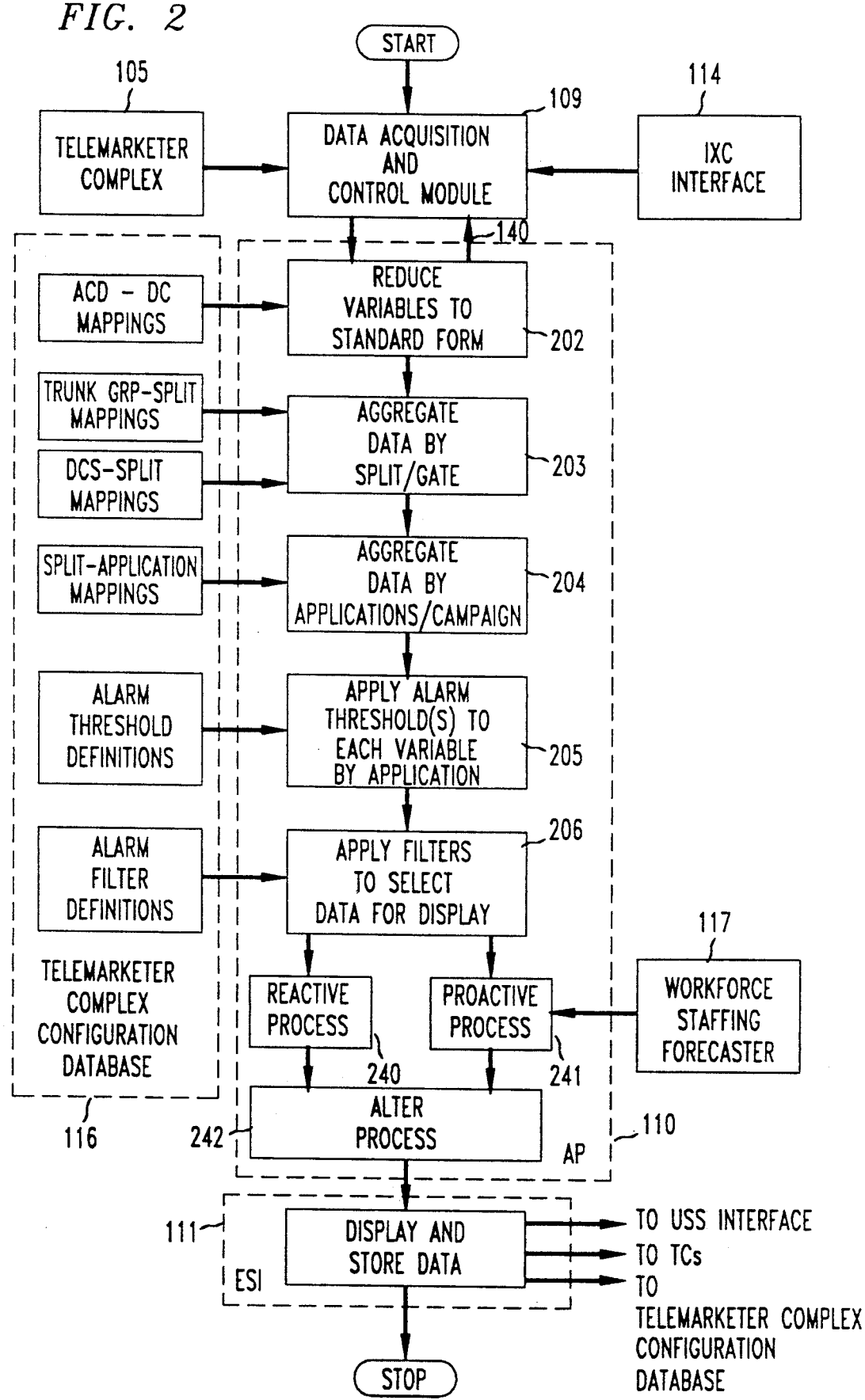
FIG. 2 is a diagram illustrating typical information contained within telemarketer complex configuration database 116 of FIG. 1 and the steps performed in application processor 110 of FIG. 1.

The data transformation process performed in AP 110 can be better appreciated by reference to FIG. 2. As stated previously, telemarketing complex configuration database 116, which is also shown in FIG. 2, includes information necessary to manage and control telemarketer complex 105. Specifically, this information can include the following: (a) mappings which define the relationships between the various ACDs ($108_1$ through $108_n$) and DCs ($107_1$ through $107_m$) in FIG. 1; (b) trunk group to split/gate mappings, which define the association between attendant stations (splits) 118, 119, 120 and inbound trunk groups appearing at each ACD; (c) mappings between DCS 112 (and other DCSs, if any, that correspond to other IXC networks) split gates 118; and (d) split/gate to application mappings, which define the relations among various groupings of splits 118, 119, 120 and telemarketing campaigns/applications offered to callers. For example, a telemarketer operating a catalog order service may define an application or campaign as consisting of calls received at three different splits. One split may receive calls from the telemarketer's retail stores. Another split may receive calls directly from the caller's residence. And yet a third split may receive calls specifically relating to matters of customer service. The splits which constitute a particular application are typically located in several TCs, but not necessarily in all TCs. Also included are (d) alarm threshold definitions which specify various alarm levels. For example, data values that deviate from a "normal" range may pass a "warning" threshold, followed by "major" and, finally, "critical" thresholds. The final information included in the telemarketer complex configuration is (e) alarm filter definitions, which select specific alarm states that are to be displayed in ESI 111, or otherwise further processed. Advantageously, telemarketer complex configuration database 116 may be implemented in a conventional PC or minicomputer that can store the aforementioned and additional or different configuration parameters similar to those described above.

Still referring to FIG. 2, the process performed in AP 110 begins in step 109, during which data, collected both from data sources within the telemarketer complex 105, as well as from data sources within public switched telecommunications network 102, and through IXC interface 114, is transformed into standard form. The data elements collected during step 109 are further described below in conjunction with FIG. 3. In order to accomplish step 202, information describing the mappings between ACD 108 and DC 107, contained in telemarketer complex configuration database 116, as well as characteristics of specific ACD manufacturer models, are used. For example, if ACDs $108_1$ and $108_2$ are provided by different manufacturers, they may incorporate different definitions of "average holding time". During step 202, data describing average holding time in each of these ACDs is normalized to account for the different definitions. This step thus assures that the subsequent processes in AP 110 produce accurate results.

The normalized data output from step 202 is next aggregated by split/gate in step 203, using the trunk group to split/gate mappings and DCS to split/gate mappings contained in telemarketer complex configuration database 116. Then, in step 204, the data is aggregated by application or campaign, using the application to split/gate mappings contained in telemarketer complex configuration database 116. Thus, in the example used above, data relating to catalog sales is aggregated by combining data obtained from one or more splits.

After the aggregation in step 204, alarm threshold definitions stored within telemarketer complex configuration database 116 are applied to each data element, on an application by application basis, in step 205. Because the amount of information generated in step 205 is high, the definitions stored in telemarketer complex configuration database 116 are used in step 206 to compare only selected data to detect the occurrence of significant alarm conditions, which represent information that the telemarketer considers important in operating its business.

The significant alarm condition information, which is filtered for display in step 206, is concurrently processed in a reactive process 240, described more fully below in FIG. 4, and a proactive process 241, described more fully below in FIG. 5. Generally speaking, the reactive process is a response to real time traffic congestion problems in the telemarketer complex, while the proactive process anticipates potential problems that may occur based upon statistical extrapolation of current traffic patterns. Because the proactive process is focused upon future conditions that are anticipated to exist in the telemarketer complex, proactive process 241 receives inputs from work force staffing forecaster 117, so that necessary comparisons between forecasts generated by TCCP 115 and actual call loads, can be made. On the other hand, reactive process 240 does not typically receive inputs from workforce staffing forecaster 117, because the reactive process occurs in real time and receives similar data from ACSs.

The outputs of both reactive process 240 and proactive process 241 are applied to an alter process 242 that is described more fully below in FIG. 6. Generally, alter process 242 generates and applies to ESI 111 signals indicative of changes that are desirable in order to improve the performance of the telemarketer complex. ESI 111, in response to such signals, both displays on suitable output devices graphical and other information that can alert telemarketer complex management personnel to current and future status of the telemarketing operation and generates a series of additional control signals that are forwarded to USS interface 113, to splits 118-120, via work force staffing forecaster 117, and to telemarketer complex configuration database 116. These signals actually implement in both telemarketer complex 105 and public switched telecommunications network 102 changes necessary to improve the performance of the telemarketer complex.

Before proceeding with a description of the reactive, proactive and alter processes 240-242, it is instructive to consider the input data collected by DAC 109. As shown in FIG. 3, such input data is broken up into six segments and originates in six sources. Specifically, a series of ACD performance variables designated generally as 301 is obtained from ACDs 108. These variables include, for example, percent service level, average speed of answer, number of calls handled, and so on. While the number of variables illustrated in FIG. 3 is large, it is to be understood that certain ACDs may be capable of providing additional or different information, and that some telemarketers may be concerned with a subset of the available information. Although not explicitly defined as an ACD performance variable, it is also to be understood that additional data derived from other sources (such as LEC central office switches) can be collected and included with input data 301, provided that suitable interfaces are put in place.

A second series 302 of data inputs is derived from data centers 107 and includes, for example, the average dollar value of the orders being placed, as well as the capacity and/or inventory currently available. This information represents the business operation status of the telemarketer and can include any type of information that the telemarketer deems important to its business operations.

Still referring to FIG. 3, data relating to the state of traffic in PSTN 102 is received from two sources. First, input data 303 is derived from 800 DCS interface 112. In addition to the number of calls received, this information may include, for example, the origin of calls received at ACDs, as classified by originating area code (NPA), and the destination of calls directed to the telemarketer via PSTN 102. Second, data 304 is derived from USS interface 113. This information may include, for example, the date and time of the last call processing logic change, as well as other information indicative of the status of call processing logic that controls traffic routing to the telemarketer via IXC network 103.

Telemarketer defined information is also derived from telemarketer complex configuration database 116 and work force staffing forecaster 117. With respect to the former, telemarketer configuration data 305 may include information describing the mapping between ACDs 108 and data centers 107, the definitions applicable to splits 118-120, trunk group specifications applicable to the ACDs, and other information which characterizes the configuration of telemarketer complex 105. With respect to the latter, telemarketer forecast data 306 may include expected call loads at each TC 106 for each split 118 and the estimated number of attendant positions to be staffed at TCs 106 as well as updates to the telemarketer's staffing profile.

Figure 4:
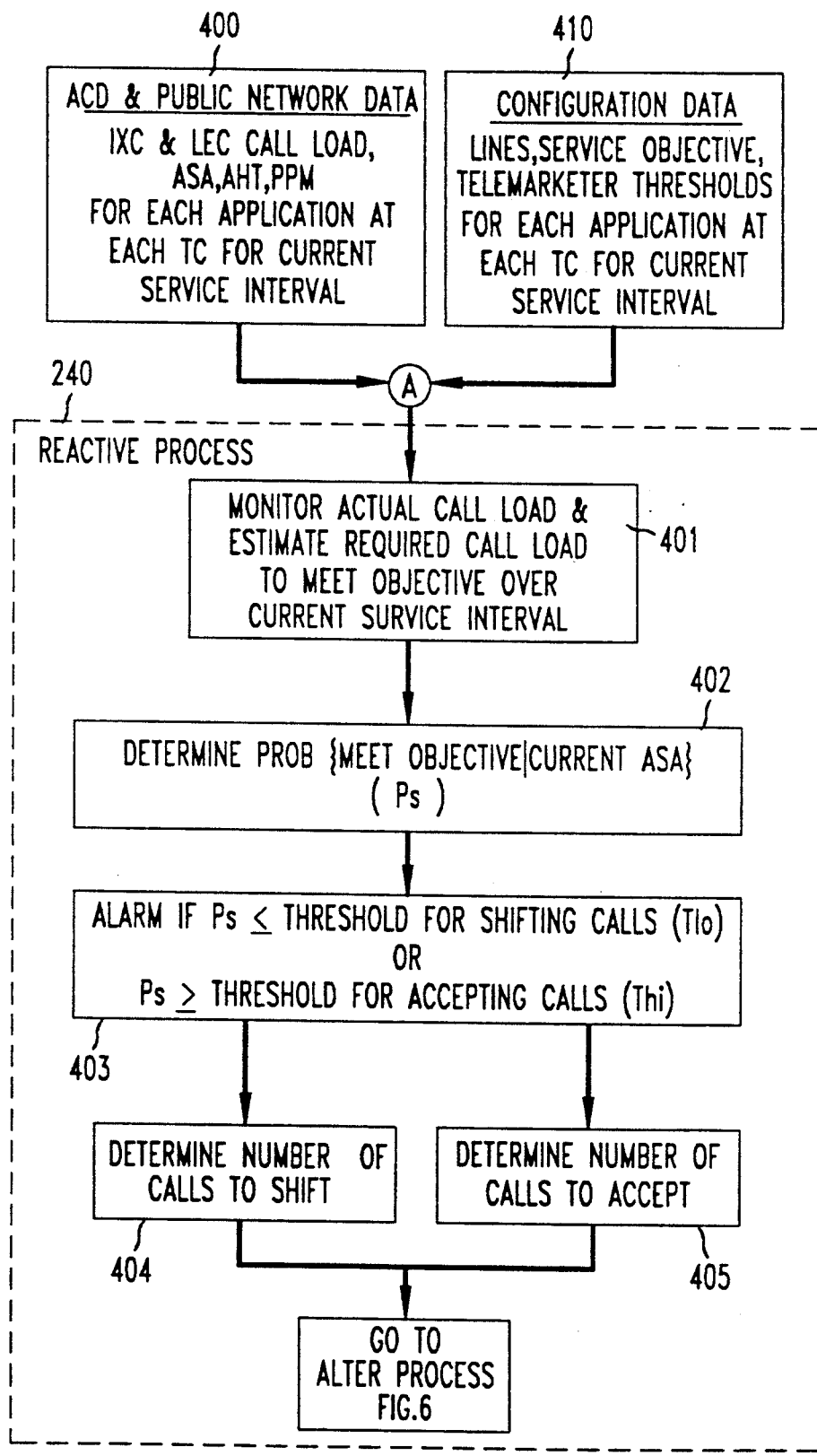
FIG. 4 illustrates the steps in the reactive process performed in application processor 110 of FIG. 1.

Referring now to FIG. 4, the process performed in reactive processor 240 is illustrated. As stated previously, the reactive process is intended to resolve traffic control congestion problems in real time, that is, in sufficient time to enable the problems to be addressed by changes in the call processing logic that defines the performance of IXC 103, as well as changes or alterations to certain parameters within telemarketer complex 105. The process of FIG. 4 combines certain elements 400 of the ACD performance measures 301 of FIG. 3 and the LEC and IXC call load offered to ACD 108 with certain elements 410 of configuration data 305 of FIG. 3, in order to report (in step 401) the actual call load for each ACD 108 as well as the required ACD call load necessary to meet telemarketer established objectives over the current service interval. The actual call load is obtained by monitoring and receiving input from 800 DCS interface 112. Based upon the actual and estimated required call loads, the probability $p_s$ of meeting current service level objectives, given current average speed of answer, is next determined in step 402. This is done so that the probabilities can be compared against preselected threshold settings in step 403. The thresholds identified in step 403 as $T_{lo}$ and $T_{hi}$ are expressions of the likelihood for a given ADC, of meeting or failing to meet, respectively, the service objective for the current service interval. $T_{lo}$ implies that the likelihood of meeting the service objective is low because an excessive number of calls are being received at the ACD. Thus, $T_{lo}$ represents the point beyond which it is unlikely that the service objective can be met without shifting calls away from the ACD. Similarly, $T_{hi}$ implies that the likelihood of meeting the service objective is high because relatively few calls are being received at the ACD. $T_{hi}$ represents the point at which there exists sufficient confidence that the service objective will be met such that the ACD may be allowed to receive additional calls that may be shifted away from other ACDs. Specifically, if the probability of meeting the objective is less than or equal to the threshold for shifting calls away from the ACD, an alarm condition is said to exist, in which too many calls are being directed to the ACD, and the number of calls to be shifted away from that ACD is determined in step 404. On the other hand, if the probability of meeting the objective is greater than or equal to the threshold for accepting calls, an alarm condition also exists in which too few calls are being directed to the ACD, and the number of additional calls to direct to that ACD is determined in step 405. In either event, the information so determined is used to alter telemarketer complex parameters as described below in FIG. 6. Of course, if the probability of meeting objectives is within the desired range of values, no alarm condition is present and the reactive process need not alter the current traffic routing patterns.

Figure 5:
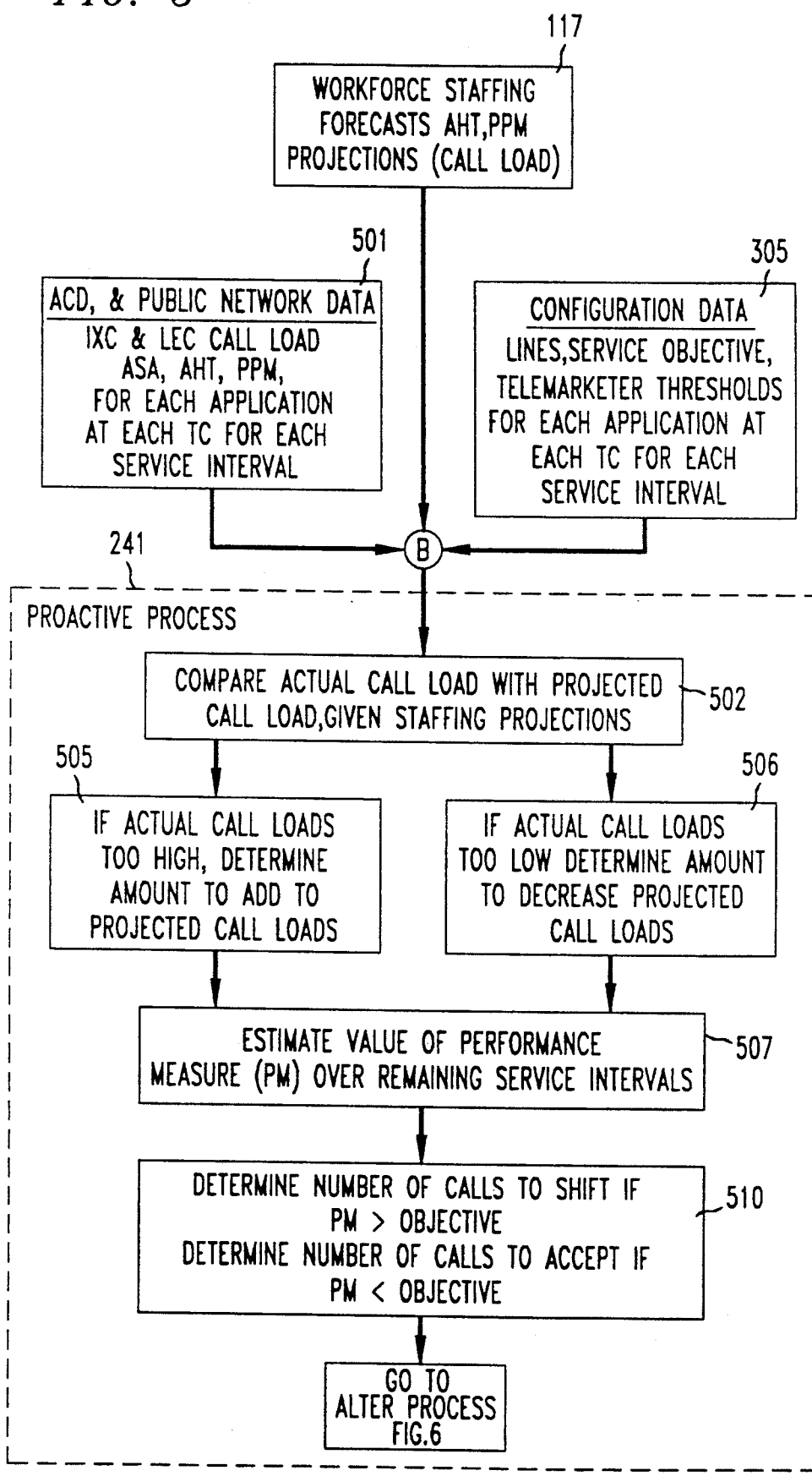
FIG. 5 illustrates the steps in the proactive process performed in application processor 110 of FIG. 1.

Before proceeding with a description of FIG. 5, it is to be understood that the reactive process of FIG. 4 may include a determination of different or additional ACD performance measures other than the current average speed of answer (ASA). For example, certain telemarketers may wish to use average handling time, average calls in queue, or other performance variables in the probability statement that determines the probability value $p_s$ in step 402.

The proactive process illustrated in FIG. 5 combines inputs from three sources in order to compare actual and projected call loads at each TC 106 in FIG. 1. First, information is received from work force staffing forecaster 117, which describes for example, projections of average handling time and primary positions manned at each TC 106. This staffing profile is based on extrapolation of expected call loads for each split/gate at each TC. Second, ACD call load information, shown as 501 in FIG. 5, which includes the number of 800, FX, and local calls received at each TC 106 for each telemarketer application and for each service interval, is obtained. This information is available from ACDs 108. Third, customer configuration data of the type shown in block 305 of FIG. 3, is obtained from the telemarketer complex configuration database 116.

The combined inputs are processed in step 502 by comparing actual and projected call loads in order to determine if the actual call loads exceed or underrun associated estimates. If actual call loads are too high, step 505 determines the deficiency or underrun in the projected call load so that the estimate can be revised upwardly and the appropriate staffing levels increased to meet the telemarketer's service objectives. On the other hand, if actual call loads are too low, step 506 determines the excess or overrun in the estimated call load so that the estimate can be revised downward and the appropriate staffing levels decreased to reassign resources to other tasks. The revised estimates generated in steps 505 or 506 are used, in step 507, to estimate the values of the particular ones of the performance measures 301 of FIG. 3 that are of interest, over the remaining service intervals. If the values of the performance measures are greater than the corresponding objectives for those measures, a determination is made in step 510 to shift calls away from the overloaded ACD. On the other hand, if the values of the performance measures do not exceed the corresponding objectives for those measures, step 510 determines the number of additional calls that may be routed to the ACD. In either event, the changes in traffic determined in step 510 are implemented in the alter process described below in FIG. 6.

Figure 6:
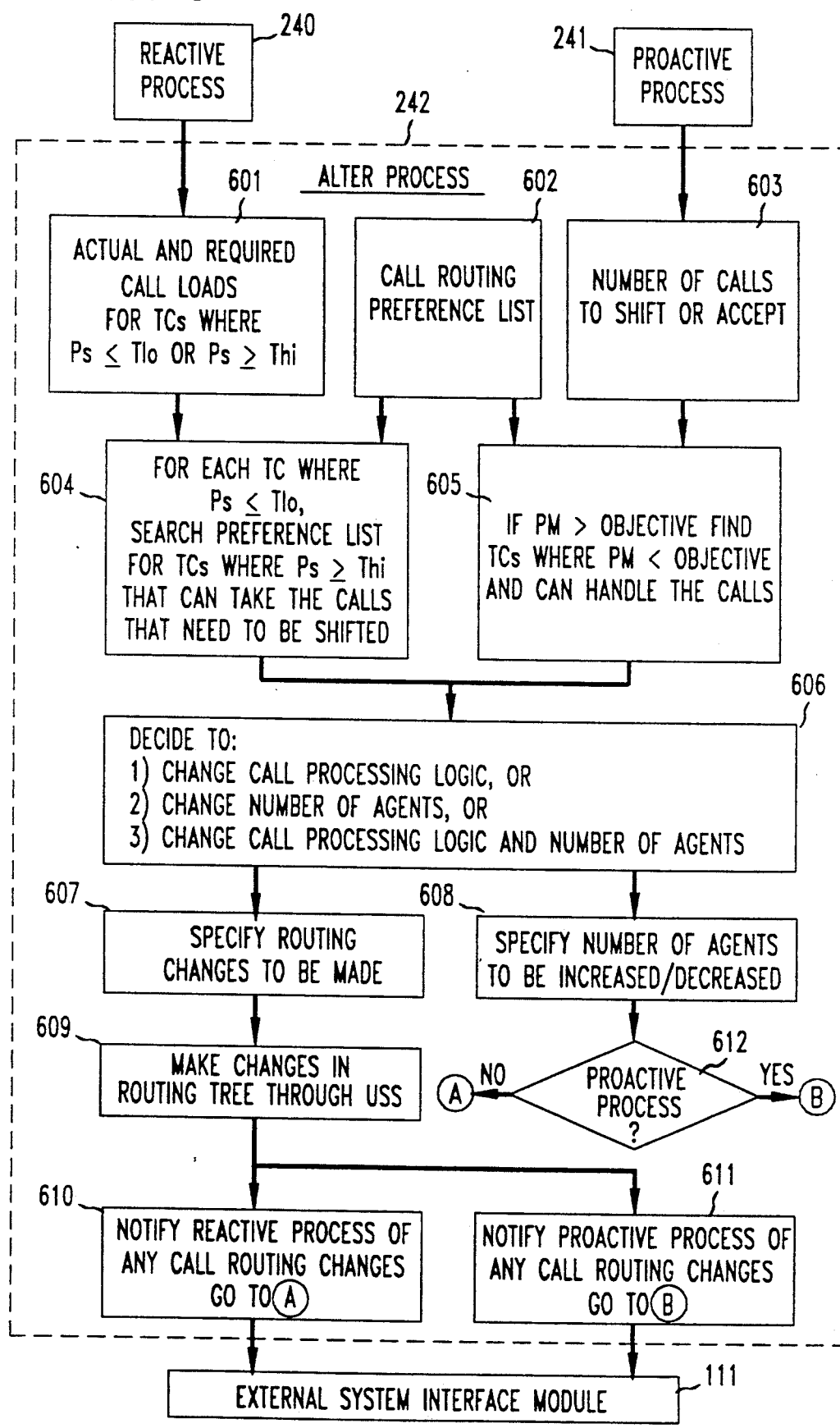
FIG. 6 illustrates the steps in the alter process performed in application processor 110 of FIG. 1.

When the reactive process of FIG. 4 or the proactive process of FIG. 5 dictates a change in either the current arrangement of call volumes received at ACDs 108 or changes in staffing levels at TCs 106, the alter process of FIG. 6 is invoked. The alter process, as illustrated in FIG. 6, determines which changes in call processing logic that govern the distribution of the call load among ACDs 108 and/or changes in work force staffing levels at TCs 106 are to be implemented. The alter process receives the outputs of the reactive process 240 and the proactive process 241, as shown in FIG. 2. Output 601, from the reactive process 240, includes actual call loads currently offered to each ACD and the corresponding required call load necessary to meet service objectives for the current service interval at each ACD in the telemarker complex. Only those ACDs that must accept additional calls or relinquish excess calls in order to meet TC's service objective for the current service interval are considered. Other output 601 may include, for example, the number of calls to be shifted away from—or received by—all ACDs in the telemarketer complex during the current service interval. Output 603, from proactive process 241, includes the number of calls to be shifted or accepted in each subsequent service interval for all ACDs.

A call routing preference list 602 shown in FIG. 6 is maintained in telemarketer complex configuration database 116 as shown in FIG. 1. The call routing preference list 602 specifies the primary, secondary and tertiary ACD distributions for calls arriving at the telemarketer complex for each NPA. Preference list 602 may also contain alternate destinations for calls conditioned upon time of day or week, or other criteria.

In the reactive process mode, ACDs that must relinquish call load are matched to those ACDs that must accept call load if traffic balance within the telemarketer complex is to be restored. Typically, each ACD may be placed in one of three categories, based on the comparison of $P_s$ to $T_{lo}$ and $T_{hi}$. When the probability of meeting the current service objective ($P_s$) is less than the threshold for shifting calls for a specified ACD, that ACD is assigned to the "shift call" category. Similarly, when the probability of meeting the current service objective is greater than the threshold for accepting calls for a specific ACD, that ACD is assigned to the "accept call" category. When $P_s$ lies between $t_{lo}$ and $t_{hi}$, the associated ACD is assigned to the "status quo call" category. In step 604, a feasible set of call traffic shifts is identified. The purpose of the activities performed in step 604 is to readjust the telemarketer complex call load so as to desirably eliminate (i.e., reduce to zero) the shift call and accept call categories. When all ACDs are contained within the "status quo call" category, a balance of call load traffic among ACDs has been accomplished.

In step 605, particular TCs 106, where one or more relevant performance measures (PMs) exceed or fail to exceed a standard objective value, are identified. This step allows the system to identify TCs where the work force may be either increased or decreased, thus permitting adjustment of staffing levels to effectively process call orders. Note that no staffing information is provided as input to the reactive process because information to affect changes in staffing levels at TCs 106 is received in real-time from ACDs 108.

In step 606, the current state of call load imbalance among ACDs 108 in the telemarketer complex 105 is assessed to determine recommended solutions. A decision is made to reestablish or maintain traffic balance in the telemarketer complex by changing call processing logic to reroute call traffic among ACDs, by altering staffing levels at TCs, or through coordinated staffing level adjustments in combination with the rerouting of traffic. Recommended traffic routing changes and work force staffing changes are implemented in steps 607 and 608.

When traffic routing changes are recommended, such changes are accomplished through modification of call processing logic programs that are stored in PSTN. Signals necessary to activate alternate call processing logic are transmitted to USS at step 609. Then USS returns a signal to TCCP indicating that alternate call processing logic has been initiated in the PSTN in order to reroute calls, the time at which the change occurred is returned to the reactive and proactive processes at blocks 610 and 611, respectively, so that relevant process parameters may be reinitialized. The continuous process of monitoring actual and required call loads for the reactive process is continued at point A in FIG. 4. Similarly, the continuous proactive process of comparing actual call load and projected call load is accomplished by returning to point B in FIG. 5.

When staffing changes are made at a TC 106, the reactive process of FIG. 4 is informed of such changes via the associated ACD 108, and the proactive process of FIG. 5 is informed through revisions in the workforce staffing forecaster 117. In step 612, if staffing changes result from the proactive process 241, the proactive process continues at point B in FIG. 5. In step 612, if staffing changes result from the reactive process, the reactive process continues at point A in FIG. 4. All changes recommendations generated by the alter process are transferred as inputs to ESI 111 of FIG. 1 for display at a telemarketer complex manager's workstation and/or output to USS interface 113 or workforce staffing forecaster 117, as required.

In FIG. 7, examples of data elements 701 that are output from the reactive process 240, and data elements 702 that are output from the proactive process 241, serve as input to the alter process 242. Examples of data elements 703 that are output from the alter process 242 also appear in FIG. 7.

Various modifications and adaptations of the present invention will be readily apparent to those skilled in the art. For this reason, it is intended that the invention be limited only by the appended claims. For example, TCCP 115 may receive and process data from a plurality of inter-exchange carries through multiple IXC interfaces, rather than from a single IXC network 103 via a single IXC interface 114 as shown in FIG. 1. In this event, IXC interfaces could be added to receive public switched toll free calls from several different long distance carriers.

Also, it is to be understood that a TCCP may be used to manage the performance of any telemarketing complex where dynamic call processing logic allows call termination to be distributed within either IXC, LEC, or private networks. For example, LECs (rather than IXCs) that possess the ability to redirect calls through use of stored program control call processing logic can also make use of a TCCP such as TCCP 115 to balance service levels for telemarketing complexes served by those LECs. In such an embodiment, call management information would be provided to TCCP 115, via a LEC interface, that would perform functions similar to those performed by IXC interface 114.

Also note that TCCP 115 is not restricted to processing 800 toll-free call management information. Rather, 900 DCS and 700 DCS interfaces may complement 800 DCS in the collection of call management data.

We claim:

1. A system for managing a telemarketing complex which includes (a) a plurality of ACDs for receiving calls placed to said telemarketing complex via routing patterns established in the public switched telecommunications network (PSTN) by telemarketer definable call processing logic, and distributing said calls to a plurality of agents; and (b) a plurality of databases containing customer order fulfillment information used by said agents in telemarketing campaigns, said management system comprising data acquisition means for receiving and collecting data relating to (a) performance of said ACDs, (b) status of said order fulfillment information relating to telemarketing campaigns contained in said databases, and (c) traffic origin and call processing logic status from said PSTN, and means for processing information in said acquisition means in order to generate control signals for altering the number of said agents receiving calls from said ACDs and/or for altering said routing patterns established by said call processing logic.

2. The invention defined in claim 1 wherein said processing means includes means for comparing said data to pre-established alarm limits.

3. The invention defined in claim 1 wherein said processing means includes means for using statistical analysis programs to generate said control signals.

4. The invention defined in claim 1 wherein said system also includes means for displaying said control signals generated by said processing means.

5. The invention defined in claim 1 wherein said system also includes means for displaying the status of said telemarketing complex to said telemarketer.

6. A system for managing a telemarketing complex, said complex including a plurality of telecommunications centers each including at least one ACD and at least one split containing a number of available agent terminals, said system comprising means for collecting data from said telemarketing complex relating to performance of said ACDs;

means for collecting data from the telecommunications network that routes calls to said telemarketing complex; and means for jointly processing information collected by both of said data collecting means in order to alter said number of available agent terminals.

7. The invention defined in claim 6 wherein said telemarketing complex further includes a plurality of databases connected to said telecommunications centers, said databases containing information used by agents at said agent terminals in telemarketing campaigns, and said data collecting means further includes means for monitoring said telemarketing campaigns using information in said databases.

8. The invention defined in claim 6 wherein said processing means is arranged to alter call routing patterns established by said telecommunications network.

9. The invention defined in claim 7 wherein said processing means includes means for comparing said collected data to pre-established alarm limits.

10. In a telemarketing complex including a plurality of automatic call distributors (ACDs) for connecting calls received in said complex to particular attendant stations, and at least one database for storing telemarketing information used at said attendant stations, a control system for managing said telemarketing complex, said system comprising means for collecting data relating to (a) performance of said ACDs, (b) status of information in said database, and (c) information relating to performance of said attendant stations; and means for processing information collected by said data collecting means in order to generate control signals for altering said telemarketing complex.

11. A method of managing a telemarketing complex which includes (a) a plurality of ACDs for receiving calls placed to said telemarketing complex via routing patterns established in the public switched telecommunications network (PSTN) by telemarketer definable call processing logic, and distributing said calls to a plurality of agents; and (b) a plurality of databases containing customer order fulfillment information used by said agents in telemarketing campaigns, said management system comprising the steps of receiving and collecting data relating to (a) performance of said ACDs, (b) status of said order fulfillment information relating to telemarketing campaigns contained in said databases, and (c) traffic origin and call processing logic status from said PSTN, and processing information obtained in said acquisition step in order to generate control signals for altering the number of said agents receiving calls from said ACDs and for altering said routing patterns established by said call processing logic.

12. The method defined in claim 11 wherein said processing step includes comparing said data to pre-established alarm limits.

13. The method defined in claim 11 wherein said processing step includes using statistical analysis programs to generate said control signals.

14. The invention defined in claim 11 wherein said method further includes the step of displaying said control signals generated in said processing step.

15. The invention defined in claim 11 wherein said method further includes the step of displaying the status of said telemarketing complex to said telemarketer.

16. A method of managing a telemarketing complex, said complex including a plurality of telecommunications centers each including at least one ACD and at least one split containing a number of available agent terminals, said method comprising the steps of:

collecting data from said telemarketing complex relating to performance of said ACDs;

collecting data from the telecommunications network that routes calls to said telemarketing complex; and jointly processing information collected by both of said data collecting means in order to alter said number of available agent terminals.

17. The method defined in claim 16 wherein said telemarketing complex further includes a plurality of databases connected to said telecommunications centers, said databases containing information used by agents at said agent terminals in telemarketing campaigns, and wherein said data collecting step includes monitoring said telemarketing campaigns using information in said databases.

18. The method defined in claim 16 wherein said processing step includes altering call routing patterns established by said telecommunications network.

19. The method defined in claim 17 wherein said processing step includes comparing said collected data to pre-established alarm limits.

20. In a telemarketing complex including a plurality of automatic call distributors (ACDs) for connecting calls received in said complex to particular attendant stations; and at least one database for storing telemarketing information used at said attendant stations;

a method of managing said telemarketing complex, said method comprising the steps of:

collecting data relating to (a) performance of said ACDs, (b) status of information in said database, and (c) information relating to performance of said attendant stations; and processing information collected in said data collecting step in order to generate control signals for altering said telemarketing complex.

21. A system for managing a telemarketing complex which includes a plurality of ACDs for receiving calls placed to said telemarketing complex via routing patterns established in the public switched telecommunications network (PSTN) by telemarketer definable call processing logic, and distributing said calls to a plurality of agents, said management system comprising data acquisition means for receiving and collecting data relating to (a) performance of said ACDs, (b) status of customer order fulfillment information used by said agents in telemarketing campaigns, and (c) traffic origin and call processing logic status from said PSTN, and means for processing information in said acquisition means in order to generate control signals for altering the number of said agents receiving calls from said ACDs and/or for altering said routing patterns established by said call processing logic.

22. A method of managing a telemarketing complex which includes a plurality of ACDs for receiving calls placed to said telemarketing complex via routing patterns established in the public switched telecommunications network (PSTN) by telemarketer definable call processing logic, and distributing said calls to a plurality of agents, said method comprising the steps of:

receiving and collecting data relating to (a) performance of said ACDs, (b) status of customer order fulfillment information used by said agents in telemarketing campaigns, and (c) traffic origin and call processing logic status from said PSTN, and processing information obtained during said last mentioned step in order to generate control signals for altering the number of said agents receiving calls from said ACDs and/or for altering said routing patterns established by said call processing logic.

* * * * *